(12) United States Patent
Hirotsu

(10) Patent No.: US 7,247,828 B2
(45) Date of Patent: Jul. 24, 2007

(54) SEMICONDUCTOR PICKUP DEVICE COMPRISING PIXEL CIRCUITS HAVING A VARYING FRAME RATE

(75) Inventor: Junichi Hirotsu, Kitakyushu (JP)

(73) Assignee: Fusayoshi Hirotsu, Fukuoka (JP)

( * ) Notice: Subject to any disclaimer, the term of this patent is extended or adjusted under 35 U.S.C. 154(b) by 43 days.

(21) Appl. No.: 11/100,555

(22) Filed: Apr. 7, 2005

(65) Prior Publication Data
US 2005/0224699 A1 Oct. 13, 2005

(30) Foreign Application Priority Data
Apr. 7, 2004 (JP) .............................. 2004-112909

(51) Int. Cl.
*H01L 27/00* (2006.01)

(52) U.S. Cl. .............................. 250/208.1; 250/214 A; 250/214 R; 348/297; 348/362

(58) Field of Classification Search ............. 250/208.1, 250/214 R, 214 A; 348/295–297, 362
See application file for complete search history.

(56) References Cited

U.S. PATENT DOCUMENTS

| | | | |
|---|---|---|---|
| 4,484,223 A * | 11/1984 | Tsunekawa | 348/245 |
| 5,706,061 A | 1/1998 | Marshall et al. | |
| 5,872,596 A * | 2/1999 | Yanai et al. | 348/297 |
| 6,323,479 B1 | 11/2001 | Hynecek et al. | |
| 6,580,454 B1 * | 6/2003 | Perner et al. | 348/302 |
| 6,831,689 B2 * | 12/2004 | Yadid-Pecht | 348/297 |
| 6,999,118 B2 * | 2/2006 | Suzuki | 348/226.1 |

2004/0256676 A1    12/2004   Hirotsu et al.

FOREIGN PATENT DOCUMENTS

| | | |
|---|---|---|
| JP | 07-298112 | 11/1995 |
| JP | 2001-203941 | 7/2001 |
| JP | 2002-320198 | 10/2002 |
| JP | 2003-169252 | 6/2003 |
| JP | 2003-198929 | 7/2003 |
| JP | 2003-262788 | 9/2003 |
| JP | 2004-015595 | 1/2004 |
| JP | 2004-80376 | 3/2004 |
| JP | 2005-12002 | 1/2005 |
| JP | 2005-051429 | 2/2005 |
| JP | 2005-86499 | 3/2005 |
| WO | WO 02/059979 A1 | 8/2002 |

OTHER PUBLICATIONS

Japanese Office Action with English translation.
Taiwanese Office Action with English translation.

* cited by examiner

*Primary Examiner*—Thanh X. Luu
*Assistant Examiner*—Stephen Yam
(74) *Attorney, Agent, or Firm*—Finnegan, Henderson, Farabow, Garrett & Dunner L.L.P.

(57) ABSTRACT

A semiconductor pickup device includes a pixel circuit including: a photodiode passing to a prescribed node a current of a value corresponding to intensity of light received; a log transistor operating in a log region when the prescribed node is increased in potential; and a reset transistor operative for the prescribed node's potential higher than a threshold potential to reset in response to a reset signal the prescribed node's potential to a reset potential, and operative for the prescribed node's potential lower than the threshold potential to avoid the resetting. For low illuminance the pixel circuit decreases in frame rate and lower minimum illuminance required for pickup can be provided.

12 Claims, 9 Drawing Sheets

SEMICONDUCTOR PICKUP DEVICE COMPRISING PIXEL CIRCUITS HAVING A VARYING FRAME RATE

BACKGROUND OF THE INVENTION

1. Field of the Invention

The present invention relates generally to semiconductor pickup devices and particularly to those having a plurality of pixel circuits arranged in a matrix.

2. Description of the Background Art

CCDs, CMOS image sensors and similar semiconductor pickup devices (also referred to as solid state image sensing devices, semiconductor image sensors) have now been mounted in video cameras, digital cameras as well as mobile phones and thus widely used in our daily life. In recent years semiconductor pickup devices are remarkable improved in performance, and wide dynamic range technology has also helped to develop that allowing a pickup allowing illuminance range of six digits or more.

FIG. 14 is a circuit diagram showing a configuration of a pixel circuit of such a semiconductor pickup device. In the figure this pixel circuit includes a photodiode 30, a log transistor 31, a reset transistor 32, and a read transistor 33. Transistors 30-33 are each implemented by an n channel MOS transistor. Photodiode 30 has an anode connected to a line of a ground potential GND and a cathode to a node N30. Log transistor 31 has its gate and drain connected to a line of a power supply potential VDD and its source to node N30. Reset transistor 32 has its drain receiving a reset potential VRH, its gate receiving a reset signal RST, and its source connected to node N30. Read transistor 33 has its gate connected to node N30.

When reset signal RST is set in a pulse to a high level of an active level, reset transistor 32 conducts and node N30 is reset to reset potential VRH. When photodiode 30 receives light, a current IP of a value corresponding to the received light's intensity flows from node N30 through photodiode 30 to the line of ground potential GND, and also from the line of power supply potential VDD through log transistor 31 to node N30 flows a current of a value corresponding to VDS-IDS characteristic of log transistor 31. A current IDS of log transistor 31 presents a logarithmical response for a range high in potential VDS, and if the received light has large intensity the current of read transistor 33 nonetheless hardly saturates. Thus the pixel circuit allows detection of a wide range of intensity of received light.

A semiconductor pickup device has a large number of such pixel circuits arranged in a matrix. Each pixel circuit receives light, which is detected in intensity by read transistor 33 to pick up an image of an object (see U.S. Pat. No. 6,323,479 for example).

For such a semiconductor image pickup device, however, all pixel circuits' frame rates are set to have the same value. As such, if for a frame rate (for example of 30 frames/second) a satisfactory image is obtained for the subject's lower illuminance area as well as higher illuminance area, for increased frame rates, however, minimum illuminance required for pickup is reduced, resulting in a blackout image for the lower illuminance area. In other words, if a semiconductor image pickup device having a wide dynamic range can be used to ensure a bandwidth of illuminance allowing an image to be picked up, minimum illuminance required for pickup cannot be ensured. This is not simply a problem associated only with high speed cameras or similar, specific applications but also all semiconductor image pickup device applications as the number of pixels tends to increase in recent years.

SUMMARY OF THE INVENTION

The present invention mainly contemplates a semiconductor pickup device allowing low minimum illuminance required for pickup.

The present invention provides a semiconductor pickup device including a plurality of pixel circuits arranged in a matrix and each having a frame rate varying with intensity of light received by the pixel circuit.

In the semiconductor pickup device each pixel circuit has a frame rate varying with intensity of light received by the pixel circuit. If the pixel circuit receives light having small intensity the circuit's frame rate can be reduced to also ensure a sufficient quantity of light for low illuminance and provide reduced minimum illuminance for pickup.

Furthermore the present invention provides another semiconductor pickup device including a plurality of pixel circuits arranged in a matrix and each having a frame rate varying with a control potential.

In the other semiconductor pickup device each pixel circuit has a frame rate varying with a control potential. If the pixel circuit receives light having small intensity the control potential can be adjusted and the circuit's frame rate thus reduced to also ensure a sufficient quantity of light for low illuminance and provide reduced minimum illuminance for pickup.

The foregoing and other objects, features, aspects and advantages of the present invention will become more apparent from the following detailed description of the present invention when taken in conjunction with the accompanying drawings.

BEST MODE FOR CARRYING OUT THE INVENTION

FIRST EMBODIMENT

Figure 1:
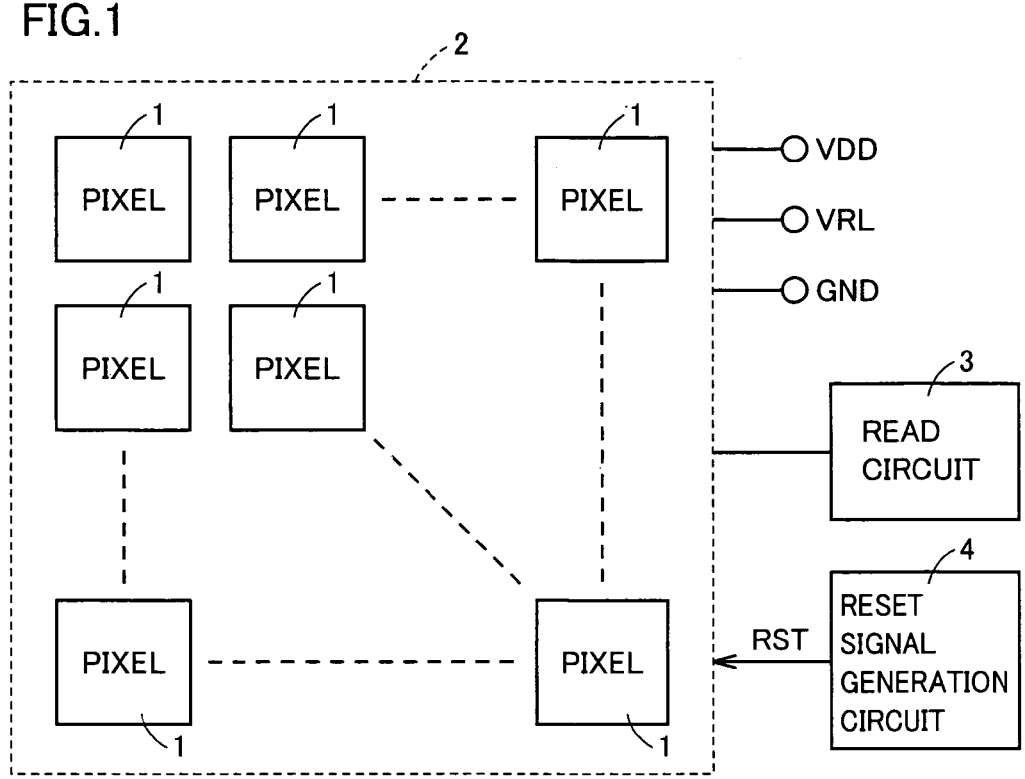
FIG. 1 is a block diagram showing a configuration of the present semiconductor pickup device in a first embodiment.

FIG. 1 is a block diagram showing a configuration of the present semiconductor pickup device in a first embodiment. In the figure the semiconductor pickup device includes a pixel array 2 including a plurality of pixel circuits 1 arranged in rows and columns, a read circuit 3, and a reset signal generation circuit 4. Pixel array 2 externally receives a power supply potential VDD, a ground potential GND and a reset potential VRL. Reset potential VRL may be generated internal to the semiconductor pickup device.

Pixel circuit 1 performs photoelectric conversion to output a potential VP corresponding to receive light's intensity. Read circuit 3 reads potential VP output from each pixel circuit 1. Reset signal generation circuit 4 generates a reset signal RST and provides the signal to each pixel circuit 1. Reset signal RST may externally be introduced.

Figure 2:
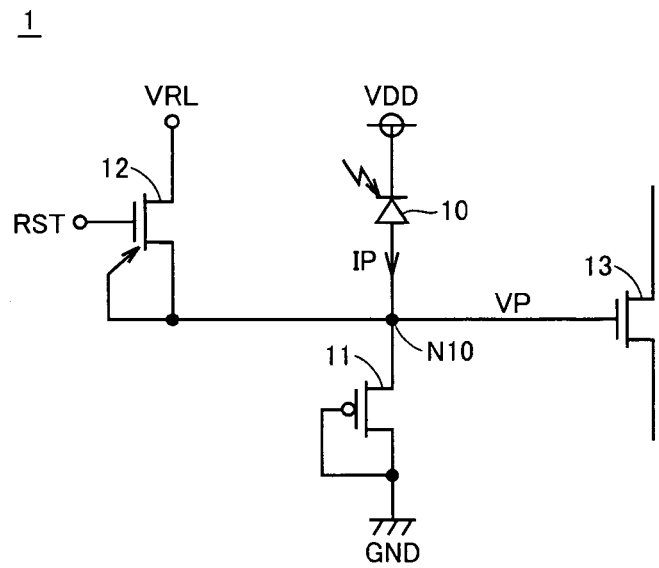
FIG. 2 is a circuit diagram showing a configuration of a pixel circuit shown in FIG. 1.

FIG. 2 is a circuit diagram showing a configuration of pixel circuit 1. In the figure, pixel circuit 1 includes a photodiode 10, a log transistor 11, a reset transistor 12 and a read transistor 13. Photodiode 10 has a cathode connected to a line of power supply potential VDD and an anode to a node N10. Photodiode 10 passes a current of a value proportional to receive light's intensity.

Figure 3:
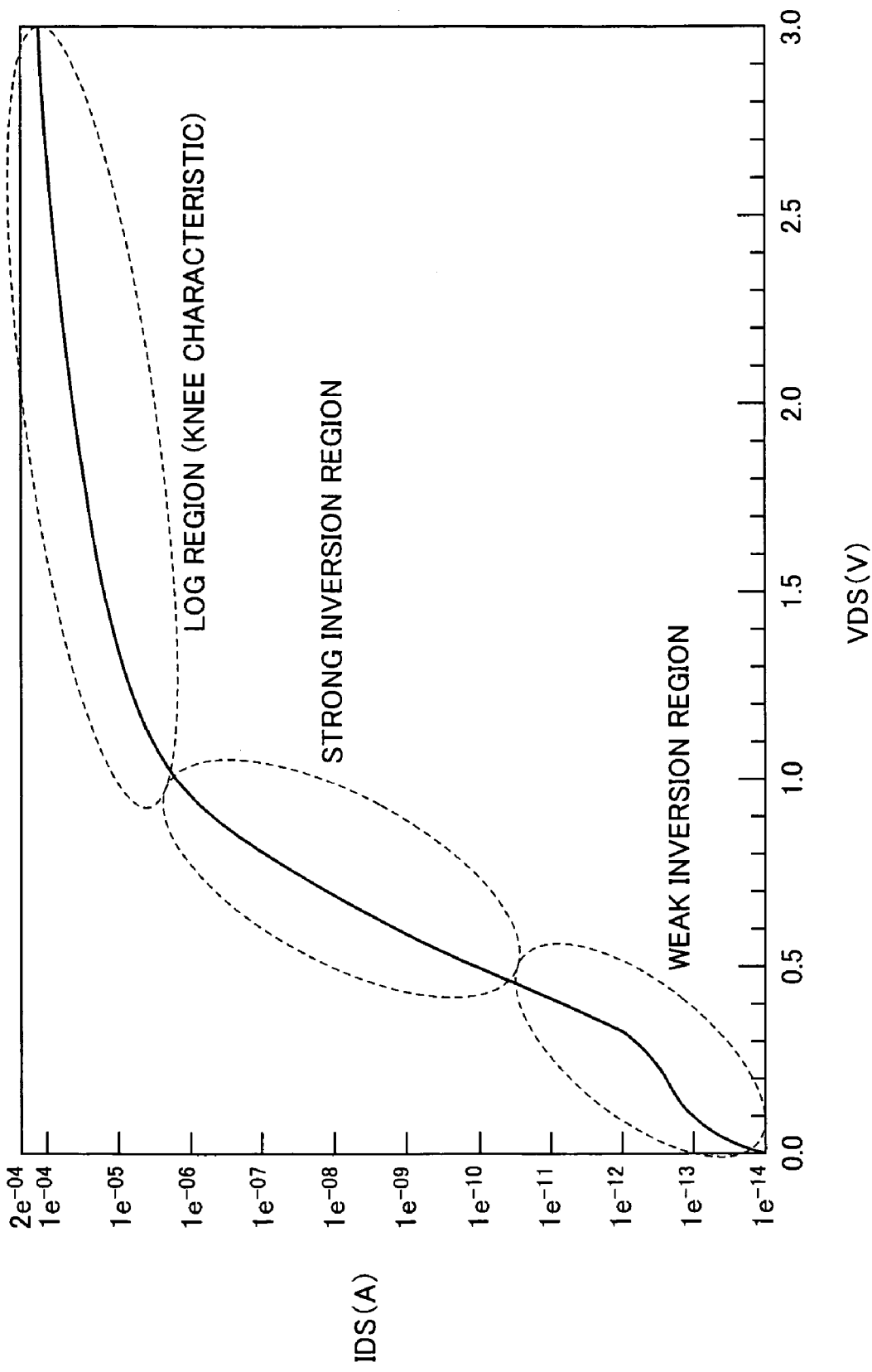
FIG. 3 represents VDS-IDS characteristic of a log transistor shown in FIG. 2.

Log transistor 11 is implemented by a p channel MOS transistor and has its source connected to node N10 and its gate and drain to a line of ground potential GND. FIG. 3 represents VDS-IDS characteristic of log transistor 11. As a VDS of 0V is gradually increased, log transistor 11 initially operates in a weak inversion region and subsequently in a strong inversion region, and when the VDS exceeds 1.0V log transistor 11 operates in a log region.

When the VDS falls within a range of 0 to 1.0, the IDS increases with the VDS exponentially, and when the VDS exceeds 1.0, the value in resistance of n and p layers of log transistor 11 cannot be neglected, and the IDS decreases in gradient. This phenomenon is referred to as a diode's knee characteristic. Thus as the VDS increases the IDS decreases in gradient, and for an optical intensity distribution of ten digits or more, read transistor 13 can be prevented from saturation.

Reset transistor 12 is implemented by an n channel MOS transistor (an n adjustable gain transistor) having a gain coefficient β varying with control gate's potential. Reset transistor 12 has a source receiving reset potential VRL, a normal gate receiving reset signal RST, and a control gate and a drain connected to node N10. Reset potential VRL is a positive potential close to ground potential GND. Reset signal RST periodically pulses to attain the high level.

The reset transistor 12 gain coefficient β decreases and increases when node N10 has potential VP decreasing and increasing, respectively. As such, if node N10 has low potential VP, and the reset signal is set high, the node N10 potential VP is not reset to reset potential VRL, and if node N10 has high potential VP, and the reset signal is set high, the node N10 potential VP is reset to reset potential VRL.

Figure 4A:
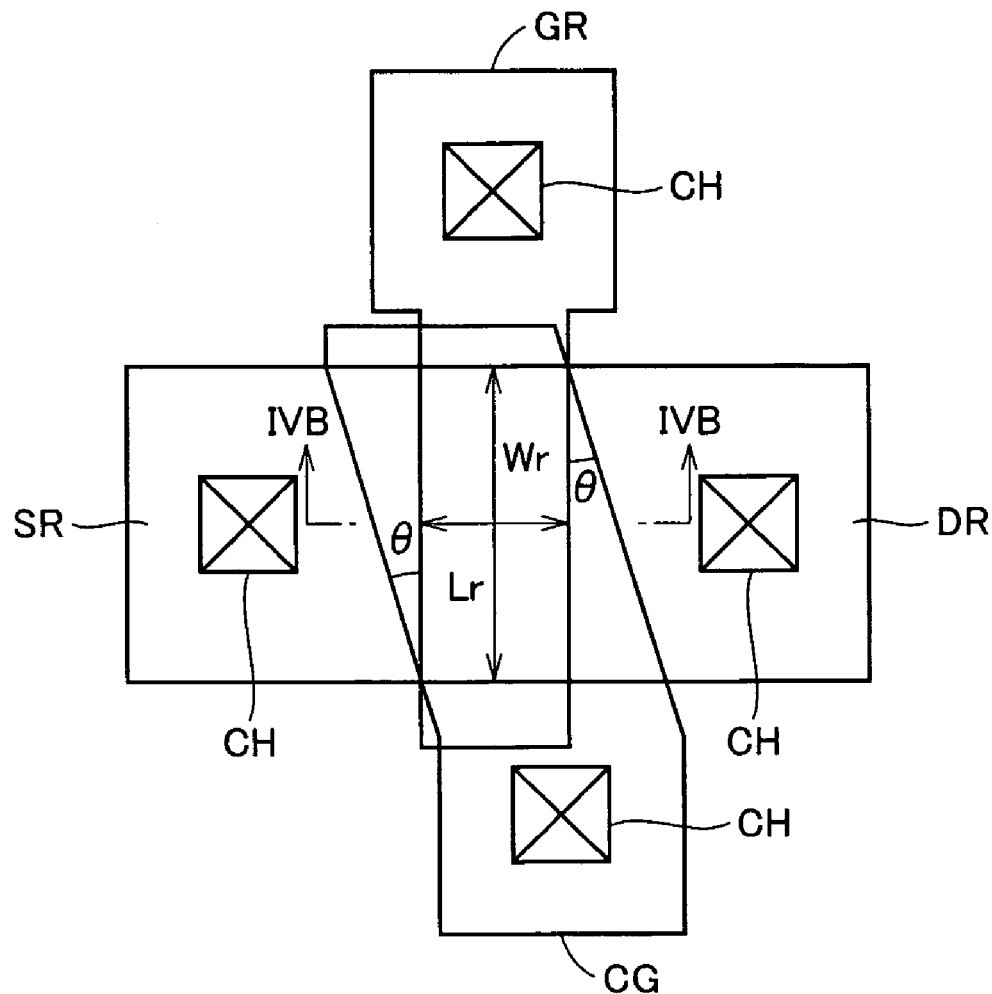
FIGS. 4A and 4B show a configuration of an n adjustable gain transistor configuring a reset transistor shown in FIG. 2.
Figure 4B:
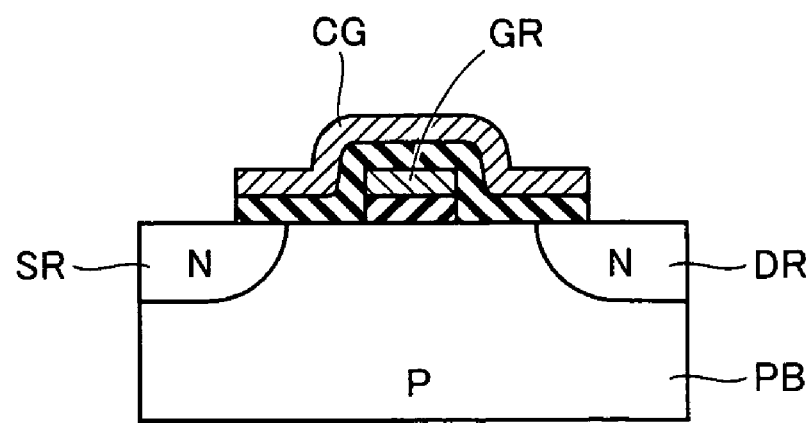

Description will now be made of the n adjustable gain transistor configuring reset transistor 12. FIG. 4A shows a layout of the n adjustable gain transistor and FIG. 4B is a cross section taken along a line IVB-IVB of FIG. 4A. In FIGS. 4A and 4B the n adjustable gain transistor includes a p silicon substrate PB having a surface provided with a normal gate GR in a strip with an insulation film posed therebetween, and normal gate GR is also covered with a control gate CG with an insulation layer therebetween. Control gate CG is arranged obliquely relative to normal gate GR. A rectangular region having a center, as seen lengthwise, orthogonal to normal gate GR is doped with n dopant to have a source SR and a drain DR at one and the other sides, respectively, relative to gates GR and CG. Normal gate GR, control gate CG, source SR and drain DR are each connected to another node via a contact hole CH. The n adjustable gain transistor has the normal gate GR gate length and width Lr and Wr and an angle θ formed by normal gate CR and control gate CG as parameters.

Figure 5A:
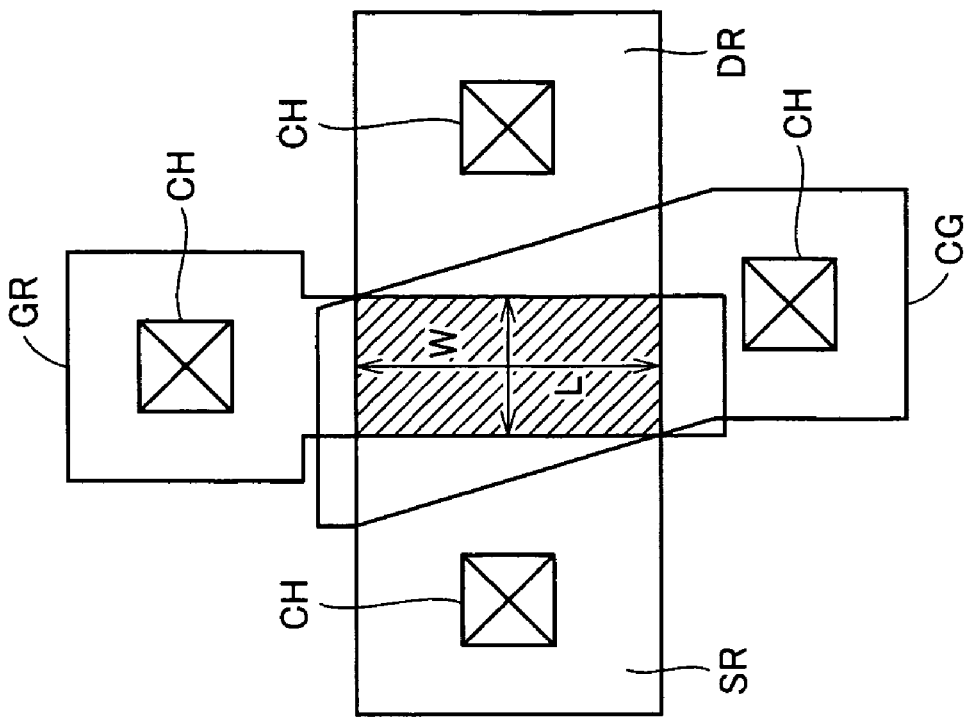
FIGS. 5A and 5B illustrate an operation of the FIGS. 4A and 4B n adjustable gain transistor.
Figure 5B:
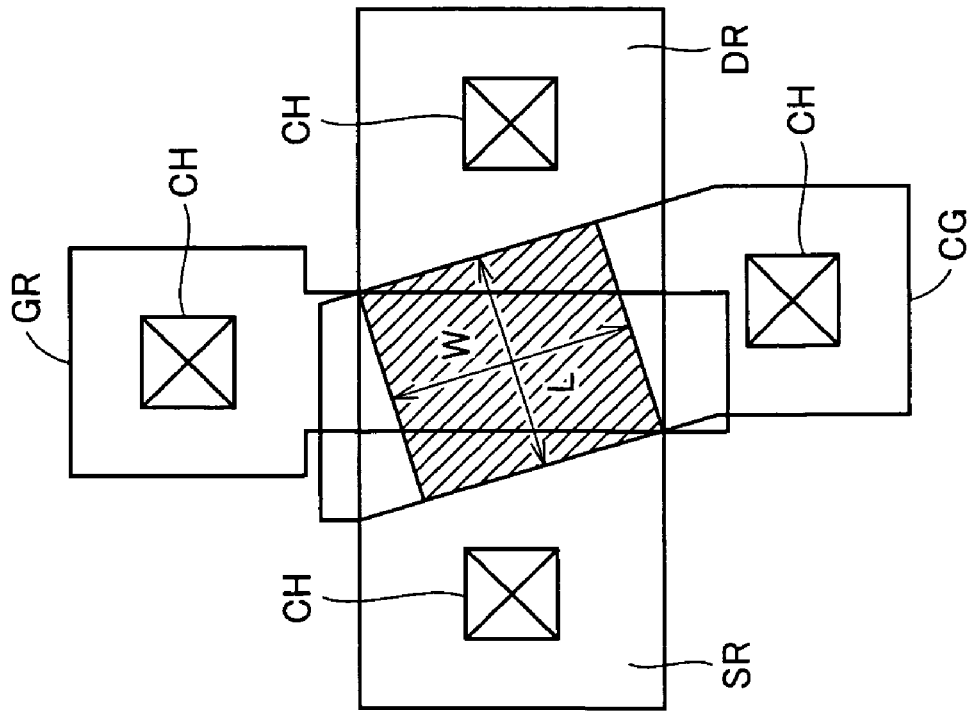

FIGS. 5A and 5B illustrate a theory of β modulation of the n adjustable gain transistor. If the control gate CG potential is set so that the conductance of a channel under control gate CG is equivalent to or smaller than normal gate GR, a portion shown hatched in FIG. 5A will be an effective gate region. More specifically, effective gate length L and width W are larger and smaller than the normal gate GR gate length Lr and width Wr, respectively, and gain coefficient β=W/L decreases.

In contrast, if the control gate CG potential is set so that the conductance of the channel under control gate CG is sufficiently larger than normal gate GR, then a portion shown hatched in FIG. 5B will be an effective gate region. More specifically, effective gate length L and width W are equivalent to the normal gate GR gate length Lr and width Wr, and gain coefficient β increases. Thus the n adjustable gain transistor's gain coefficient β varies with the control gate CG potential. Gain coefficient β's modulation characteristic can be set by parameters Wr, Lr, θ.

In FIGS. 4A and 4B, normal gate GR is covered with control gate CG obliquely arranged. Alternatively, control gate CG may have removed a portion upper than normal gate GR. Alternatively, normal gate GR obliquely arranged may be covered with control gate CG formed in a strip. Alternatively, normal gate GR in the form of the letter V may be covered with control gate CG provided in the form of a trip (see WO02/059979 A1). Furthermore, normal gate GR is covered with a wide and I letter shaped control gate CG (see Japanese Patent Laying-Open No. 2005-012002).

Figure 6:
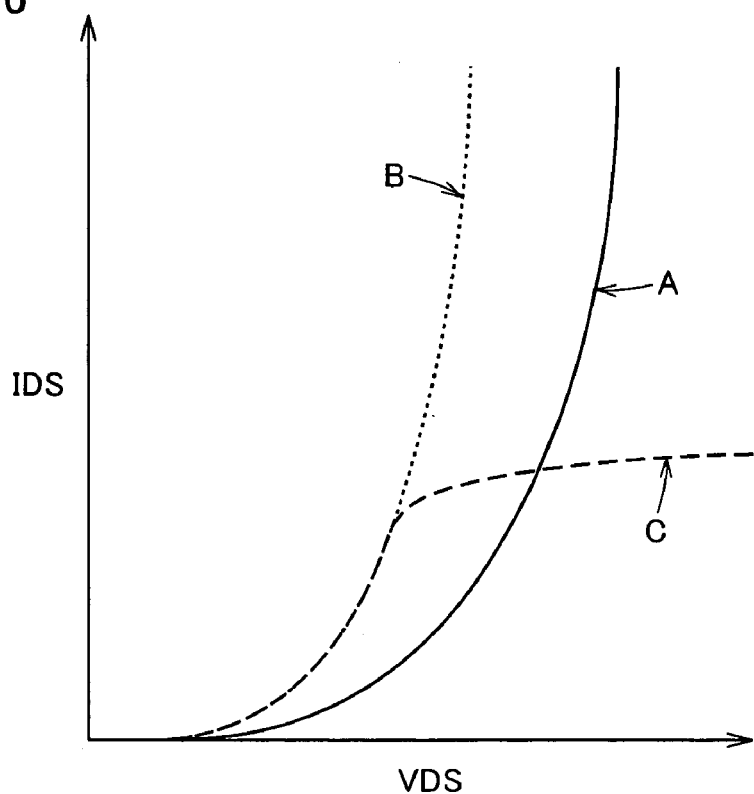
FIG. 6 is another diagram for illustrating the FIG. 4 transistor's operation.

FIG. 6 represents VDS-IDS characteristics of log transistor 11 and reset transistor 12, respectively. In the figure, a curve A represents the log transistor 11 VDS-IDS characteristic. A curve B represents the reset transistors 12 VDS-IDS characteristic provided when node N10 has sufficiently high potential VP and reset signal RST is fixed at the high level of the active level. A curve C represents the reset transistors 12 VDS-IDS characteristic provided when node N10 has sufficiently low potential VP and reset signal RST is fixed at the high level of the active level. For a range with the node N10 potential VP higher than reset potential VRL, curve B is upper than curve A and curve C is lower than curve A.

This indicates that if the node N10 potential VP is sufficiently high, and reset signal RST is set to the high level of the active level, the node N10 potential VP is reset to reset potential VRL, and if the node N10 potential VP is sufficiently low, and reset signal RST is set to the high level of the active level, the node N10 potential VP is nonetheless not reset to reset potential VRL.

Figure 7:
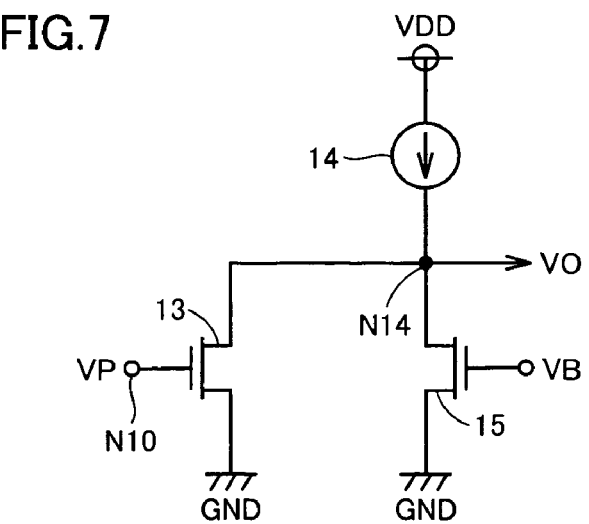
FIG. 7 shows a main portion of a read circuit shown in FIG. 1.

Read transistor 13 is implemented by an n channel MOS transistor and has its gate connected to node N10. Read transistor 23 may be implemented by a p channel MOS transistor. Read transistor 13 is coupled with read circuit 3 via an interconnect and a switch (not shown). FIG. 7 is a circuit diagram showing a selected pixel circuit 1 read transistor 13 coupled with read circuit 3. In the figure, read circuit 3 includes a constant current source 14 and an n channel MOS transistor 15 connected in series between a line of power supply potential VDD and a line of ground potential GND.

When pixel circuit 1 is selected, read transistor 13 has its drain connected to a line of ground potential GND and its source to a node N14 provided between constant current source 14 and n channel MOS transistor 15. N channel MOS transistor 15 has its gate receiving a specific bias potential VB. N channel MOS transistor 15 configures a resistance element. In accordance with the node N10 potential VP read transistor 13 varies in resistance and the node N14 potential VO varies. By detecting potential VO, the intensity of light received by pixel circuit 1 can be detected. While FIG. 7 shows amplifying potential VP to read it, potential VP may be read in the source follower system or any other method.

Figure 8:
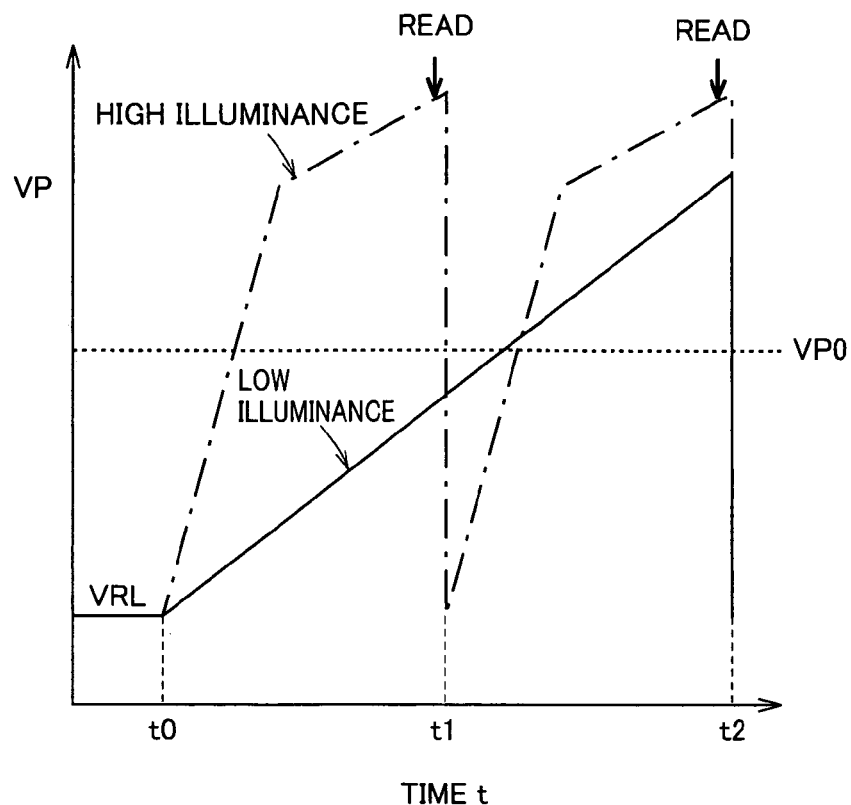
FIG. 8 represents an operation of a pixel circuit show in FIGS. 1-7.

FIG. 8 is a timing plot for illustrating an operation of pixel circuit 1 described with reference to FIGS. 1-7. FIG. 8 indicates a variation with time of potential VP of node 10 for higher illuminance or when pixel circuit 1 receives light higher in intensity, as indicated by a dashed line, and a variation with time of potential VP for lower illuminance or when pixel circuit 1 receives light lower in intensity, as indicated by a solid line. Reset pulse RST periodically (in FIG. 8, at times t0, t1, t2) pulses to attain the high level of the active level periodically. In initialization, the node N10 potential VP is reset to reset potential VRL for the sake of illustration.

For potential VP higher than a threshold potential VP0, the reset transistor 12 current driving force is larger than the log transistor 11 current driving force, and when reset transistor 12 conducts, potential VP is reset to reset potential VRL. For potential VP lower than threshold potential VP0, the reset transistor 12 current driving force is smaller than the log transistor 11 current driving force, and if reset transistor 12 conducts, potential VP is not reset to reset potential VRL. Note that threshold potential VP0 is set to a prescribed potential between reset potential VRL and power supply potential VDD.

For higher illuminance, photodiode 10 passes a current IP having a relatively large value therethrough and the node N10 potential VP rapidly increases. When potential VP enters the log transistor 11 log operation range, however, potential VP decreases in gradient. Potential VP is read immediately before time t1. At time t1 potential VP is higher than threshold potential VP0 and the reset transistor 12 gain coefficient β is high, and when reset signal RST pulses to attain the high level, reset transistor 12 conducts with large current driving force and potential VP is reset to reset potential VRL. If received light does not vary in illumination level, an operation similar to that for time t0-t1 is also performed for time t1-t2.

For lower illuminance, photodiode 10 passes current IP having a relatively small value therethrough and the node N10 potential VP gradually increases. Potential VP does not enter the log transistor 11 log operation range, and potential VP has a fixed gradient. Potential VP is read immediately before time t1. At time t1 potential VP is lower than threshold potential VP0 and the reset transistor 12 gain coefficient β is low, and if at time t1 reset signal RST pulses to attain the high level and reset transistor 12 conducts, potential VP is not reset to reset potential VRL and the node N10 potential VP further increases. Potential VP is again read immediately before time t2. At time t2, potential VP is higher than threshold potential VP0 and the reset transistor 12 gain coefficient β is high, and when reset signal RST pulses to attain the high level, reset transistor 12 conducts with large current driving force, and potential VP is reset to reset potential VRL. This means that pixel circuit is reset in an increased period and a reduced frame rate is provided.

In the first embodiment if pixel circuit 1 receives light small in intensity the circuit's frame rate can be reduced so that a sufficient quantity of light can also be obtained for a low illuminance region and reduced minimum illuminance for pickup can be provided.

Figure 9:
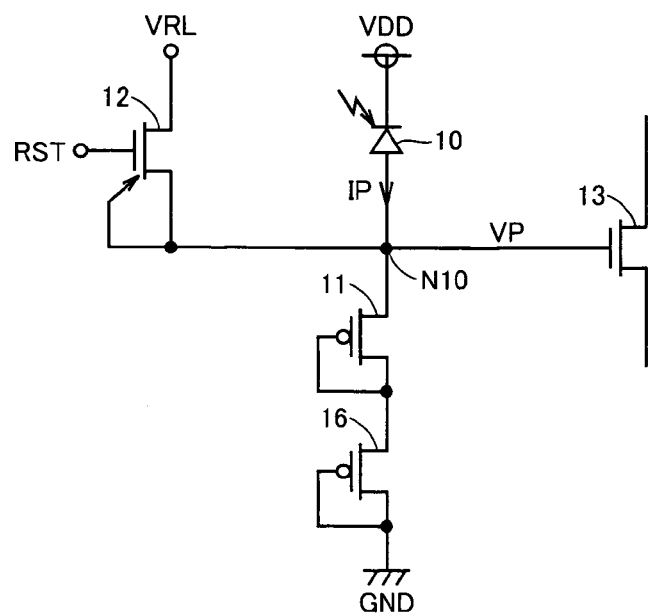
FIG. 9 shows an exemplary variation of the first embodiment.

FIG. 9 shows the first embodiment in an exemplary variation. In the figure this pixel circuit corresponds to the FIG. 2 pixel circuit 1 plus a log transistor 16 implemented by a p channel MOS transistor and having its source connected to log transistor 11 at the gate and the drain and its gate and drain to a line of ground potential GND. Log transistor 16 has the same VDS-IDS characteristic as log transistor 11. This allows a rate at which the node N10 potential VP is increased by receiving light that is twice that of pixel circuit 1. Although log transistor 16 contributes to an increased layout area, it allows a substantially higher sensitivity than in pixel circuit 1 to allow an image to be picked up with lower illuminance. Note that while in this exemplary variation two log transistors 11, 16 are connected in series between node N10 and the line of ground potential GND, three or more log transistors may be connected in series.

SECOND EMBODIMENT

Figure 10:
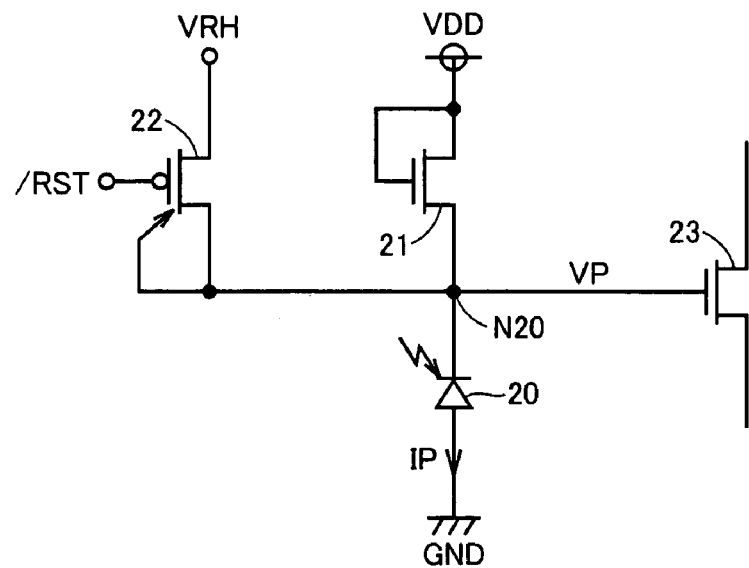
FIG. 10 is a circuit diagram showing a configuration of a pixel circuit of the present semiconductor pickup device in a second embodiment.

FIG. 10 is a circuit diagram showing a configuration of a pixel circuit of the present semiconductor pickup device in a second embodiment. In the figure this pixel circuit includes a photodiode 20, a log transistor 21, a reset transistor 22 and a read transistor 23. Photodiode 20 has a cathode connected to a node N20 and an anode to a line of ground potential GND. Photodiode 20 passes a current of a value proportional to received light's intensity.

Log transistor 21 is implemented by an n channel MOS transistor and has its source connected to node N20 and its gate and drain to a line of power supply potential VDD. Log transistor 21 has the same VDS-IDS characteristic as the FIG. 3 log transistor 11, having a weak inversion region, a strong inversion region and a log region.

Reset transistor 22 is implemented by a p channel MOS transistor (a p adjustable gain transistor) having a gain coefficient β varying with control gate's potential. Reset transistor 22 has a source receiving reset potential VRH, a normal gate receiving reset signal /RST, and a control gate and a drain connected to a node N20. Reset potential VRH is a positive potential lower than and close to power supply potential VDD. Reset signal /RST periodically pulses to attain the low level.

The reset transistor 22 gain coefficient β increases and decreases as node N20 has potential VP decreasing and increasing, respectively. As such, if node N20 has potential VP higher than threshold potential VP0, and the reset signal is set low, the node N20 potential VP is not reset to reset potential VRH, and if node N20 has potential VP lower than threshold potential VP0, and the reset signal is set low, the node N20 potential VP is reset to reset potential VRH. Note that threshold potential VP0 is set at a prescribed potential between ground potential GND and reset potential VRH.

Read transistor 23 is implemented by an n channel MOS transistor and has its gate connected to node N20. Note that read transistor 23 may be implemented by a p channel MOS transistor. The remainder in configuration and operation is identical to that described in the first embodiment.

The second embodiment can achieve the same effect as the first embodiment. Furthermore, the first embodiment requires that a photodiode be formed in an n well, and a depletion layer expanding between a p substrate and the n well contributes to punch through between the depletion layer sandwiched by the p substrate and the n well and that sandwiched by the n well and a p$^+$ doped region, whereas the second embodiment provides a photodiode in an n well and the punch through can be avoided. This can alleviate a condition for forming the photodiode in a fabrication process. Controllability can be improved and steady product supply can be achieved.

Figure 11:
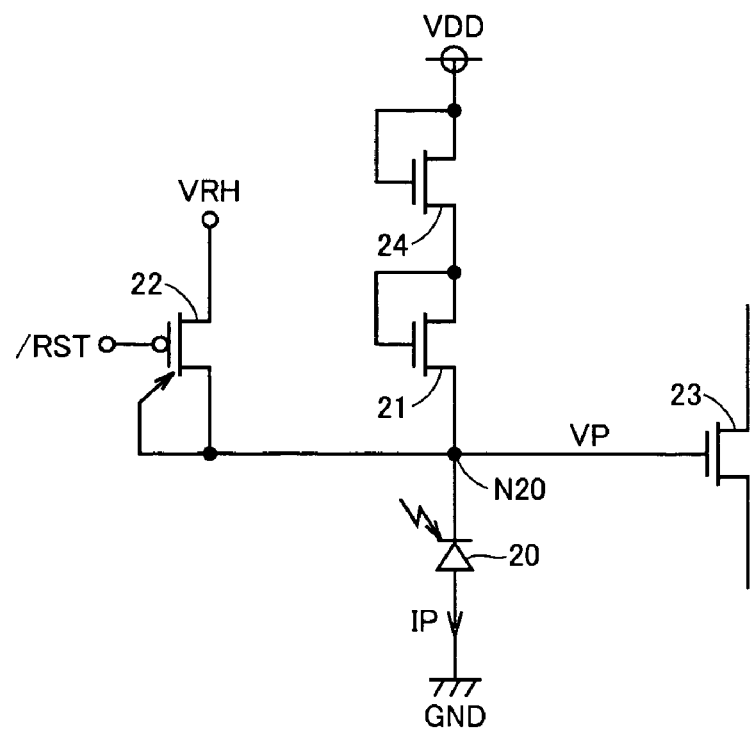
FIG. 11 shows an exemplary variation of the second embodiment.

FIG. 11 shows the second embodiment in an exemplary variation. In the figure this pixel circuit corresponds to the FIG. 10 pixel circuit plus a log transistor 24 implemented by an n channel MOS transistor and having its source connected to a log transistor 21 at the gate and drain and its gate and drain to a line of power supply potential VDD. Log transistor 24 has the same VDS-IDS characteristic as log transistor 21. This allows a rate at which the node N20 potential VP is decreased by receiving light that is twice that of the FIG. 10 pixel circuit. Although log transistor 24 contributes to an increased layout area, it allows a substantially higher sensitivity than in the FIG. 10 pixel circuit to allow an image to be picked up with lower illuminance. Note that while in this exemplary variation two log transistors 24, 21 are connected in series between the line of power supply potential VDD and node N20, three or more log transistors may be connected in series.

THIRD EMBODIMENT

Figure 12:
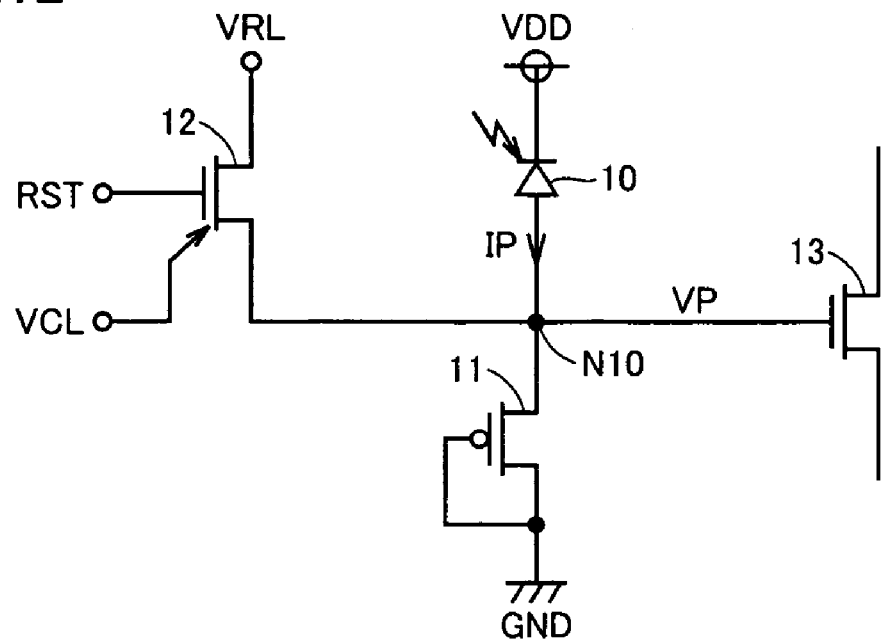
FIG. 12 is a circuit diagram showing a configuration of a pixel circuit of the present semiconductor pickup device in a third embodiment.

FIG. 12 is a circuit diagram showing a configuration of a pixel circuit of the present semiconductor pickup device in a third embodiment. In the figure this pixel circuit corresponds to the FIG. 2 pixel circuit 1 having reset transistor 12 with a control gate receiving a control potential VCL adjustable to adjust the pixel circuit's frame rate, as desired.

Control potential VCL for example has an average value of potentials VPs of nodes N10 of all pixel circuits. If significantly low illuminance is provided and a significantly low average VP value is provided, a reset cycle as defined cannot provide sufficient VP. This semiconductor pickup device can cancel resetting until potential VP increases to attain a readable level. A sufficient quantity of light can also be obtained for low illuminance region and reduced minimum illuminance for pickup can be provided.

While in the third embodiment a single log transistor 11 is connected between node N10 and the line of ground potential GND, a plurality of log transistor may be connected in series.

Figure 13:
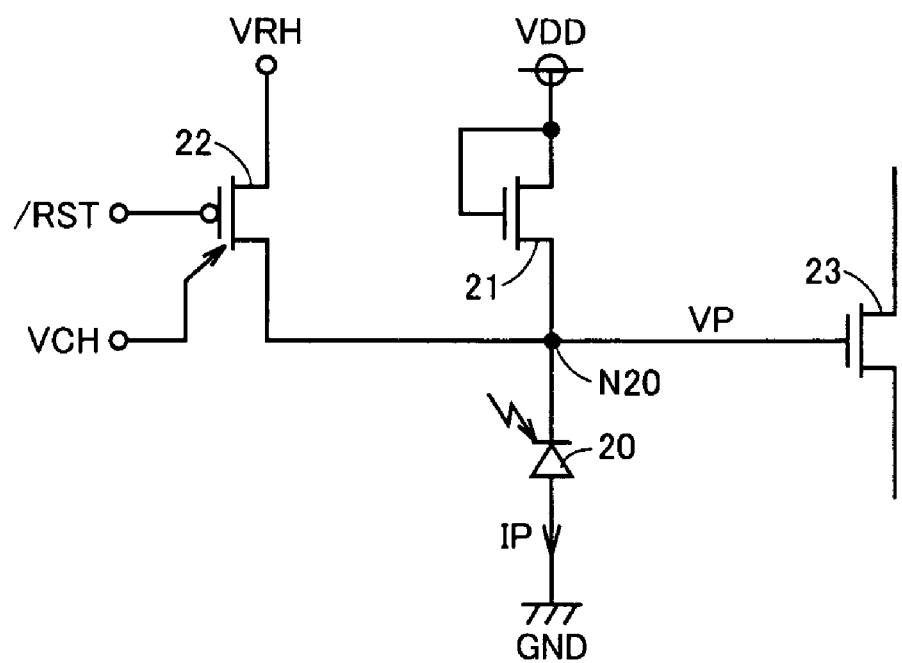
FIG. 13 shows an exemplary variation of the third embodiment.
Figure 14:
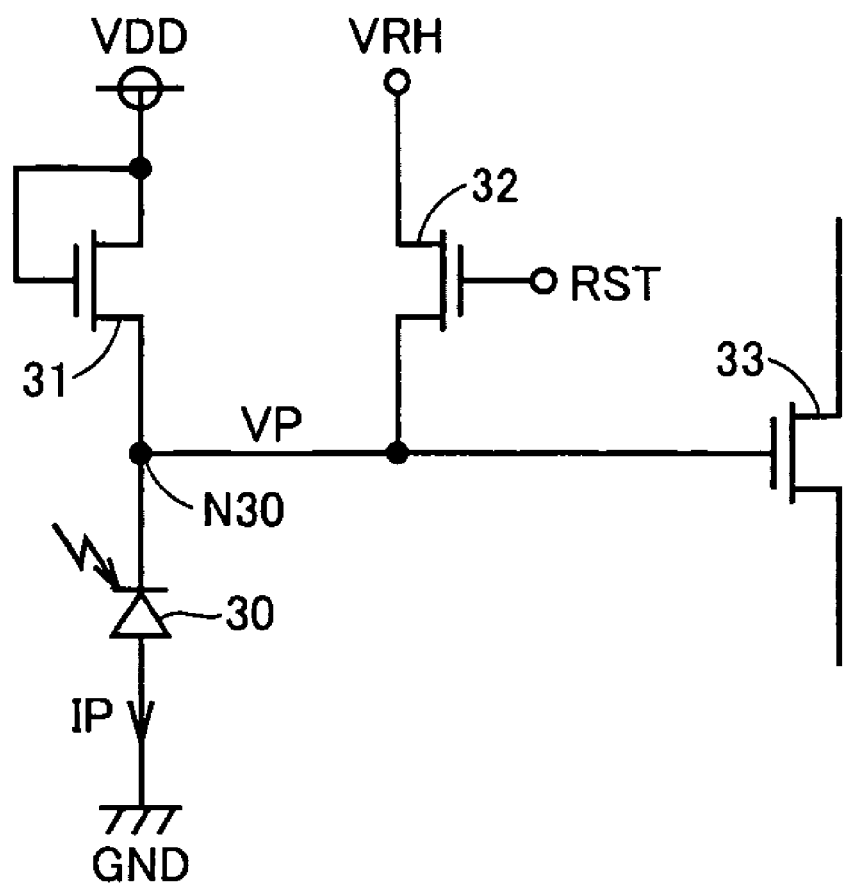
FIG. 14 is a circuit diagram showing a configuration of a pixel circuit of a semiconductor pickup device as conventional.

FIG. 13 is a circuit diagram showing the third embodiment in an exemplary variation. In the figure this pixel circuit corresponds to the FIG. 10 pixel circuit having reset transistor 22 with a control gate receiving a control potential VCH adjustable to adjust the pixel circuit's frame rate, as desired. This exemplary variation can also achieve the same effect as the third embodiment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A semiconductor pickup device comprising a plurality of pixel circuits arranged in a matrix and each outputting a potential corresponding to intensity of light received by said pixel circuit, wherein:

each said pixel circuit includes
  a photodiode having a cathode connected to a line of a power supply potential and an anode connected to an output node, and passing a current of a value corresponding to intensity of light received;
  a first p type transistor having a drain connected to said output node and a gate and a source connected to a line of a reference potential; and
  a reset circuit operative for said output node having a potential higher than a threshold potential predetermined between said power supply potential and said reference potential to reset in response to a reset signal input periodically as predetermined said output node to a reset potential predetermined between said threshold potential and said reference potential, and operative for said output node having said potential lower than said threshold potential to avoid resetting said output node to said reset potential in response to said reset signal received; and said output node of each said pixel circuit is reset to said reset potential with an interval time that independently varies in response to intensity of light received by said pixel circuit and is longer for smaller intensity of light received by said pixel circuit.

2. The semiconductor pickup device of claim 1, wherein said reset circuit includes an n type adjustable gain coefficient transistor having a normal gate receiving said reset signal, a source receiving said reset potential, and a control node and a drain connected to said output node, and having a gain coefficient increasing as said control node increases in potential.

3. The semiconductor pickup device of claim 1, wherein each said pixel circuit further includes at least one second p type transistor connected between said output node and said line of said reference potential in series with said first p type transistor and having a gate and a drain interconnected.

4. A semiconductor pickup device comprising a plurality of pixel circuits arranged in a matrix and each outputting a potential corresponding to intensity of light received by said pixel circuit, wherein:

each said pixel circuit includes
  a photodiode having a cathode connected to an output node and an anode connected to a line of reference potential, and passing a current of a value corresponding to intensity of light received;
  a first n type transistor having a gate and a source connected to a line of a power supply potential and a drain connected to said output node; and
  a reset circuit operative for said output node having a potential lower than a threshold potential predetermined between said power supply potential and said reference potential to reset in response to a reset signal input periodically as predetermined said output node to a reset potential predetermined between said power supply potential and said threshold potential, and operative for said output node having said potential higher than said threshold potential to avoid resetting said output node to said reset potential in response to said reset signal received; and said output node of each said pixel circuit is reset to said reset potential with an interval time that independently varies in response to intensity of light received by said pixel circuit and is longer for smaller intensity of light received by said pixel circuit.

5. The semiconductor pickup device of claim 4, wherein said reset circuit includes a p type adjustable gain coefficient transistor having a normal gate receiving said reset signal, a source receiving said reset potential, and a control node and a drain connected to said output node, and having a gain coefficient increasing as said control node decreases in potential.

6. The semiconductor pickup device of claim 4, wherein each said pixel circuit further includes at least one second n type transistor connected between said line of said power supply potential and said output node in series with said first n type transistor and having a gate and a drain interconnected.

7. A semiconductor pickup device comprising a plurality of pixel circuits arranged in a matrix and each outputting a potential corresponding to intensity of light received by said pixel circuit, wherein:
  each said pixel circuit includes
    a photodiode having a cathode connected to a line of a power supply potential and an anode connected to an output node, and passing a current of a value corresponding to intensity of light received;
    a first p type transistor having a drain connected to said output node and a gate and a source connected to a line of a reference potential; and
    a reset circuit operative for said control potential higher than a threshold potential predetermined between said power supply potential and said reference potential to reset in response to a reset signal input periodically as predetermined said output node to a reset potential predetermined between said threshold potential and said reference potential, and operative for said control potential lower than said threshold potential to avoid resetting said output node to said reset potential in response to said reset signal; and
  said output node of each said pixel circuit is reset to said reset potential with an interval time that is controllable by adjusting said control potential of said pixel circuit.

8. The semiconductor pickup device of claim 7, wherein said reset circuit includes an n type adjustable gain coefficient transistor having a normal gate receiving said reset signal, a control gate receiving said control potential, a source receiving said reset potential, and a drain connected to said output node, and having a gain coefficient increasing as said control node increases in potential.

9. The semiconductor pickup device of claim 7, wherein each said pixel circuit further includes at least one second p type transistor connected between said output node and said line of said reference potential in series with said first p type transistor and having a gate and a drain interconnected.

10. A semiconductor pickup device comprising a plurality of pixel circuits arranged in a matrix and each outputting a potential corresponding to intensity of light received by said pixel circuit, wherein:
  each said pixel circuit includes
    a photodiode having a cathode connected to an output node and an anode connected to a line of a reference potential, and passing a current of a value corresponding to intensity of light received;
    a first n type transistor having a gate and a source connected to a line of a power supply potential and a drain connected to said output node; and
    a reset circuit operative for a control potential lower than a threshold potential predetermined between said power supply potential and said reference potential to reset in response to a reset signal input periodically as predetermined said output node to a reset potential predetermined between said power supply potential and said threshold potential, and operative for said control potential higher than said threshold potential to avoid resetting said output node to said reset potential in response to said reset signal; and
  said output node of each said pixel circuit is reset to said reset potential with an interval time that is controllable by adjusting said control potential of said pixel circuit.

11. The semiconductor pickup device of claim 10, wherein said reset circuit includes a p type adjustable gain coefficient transistor having a normal gate receiving said reset signal, a control node receiving said control potential, a source receiving said reset potential, and a drain connected to said output node, and having a gain coefficient increasing as said control node decreases in potential.

12. The semiconductor pickup device of claim 10, wherein each said pixel circuit further includes at least one second n type transistor connected between said line of said power supply potential and said output node in series with said first n type transistor and having a gate and a drain interconnected.

* * * * *